April 5, 1932.   F. A. GARBUTT   1,852,005
METHOD OF FORMING CHEWING GUM
Filed March 4, 1931   4 Sheets-Sheet 1

INVENTOR:
Frank A. Garbutt,
By
ATTORNEY.

April 5, 1932.  F. A. GARBUTT  1,852,005
METHOD OF FORMING CHEWING GUM
Filed March 4, 1931  4 Sheets-Sheet 2
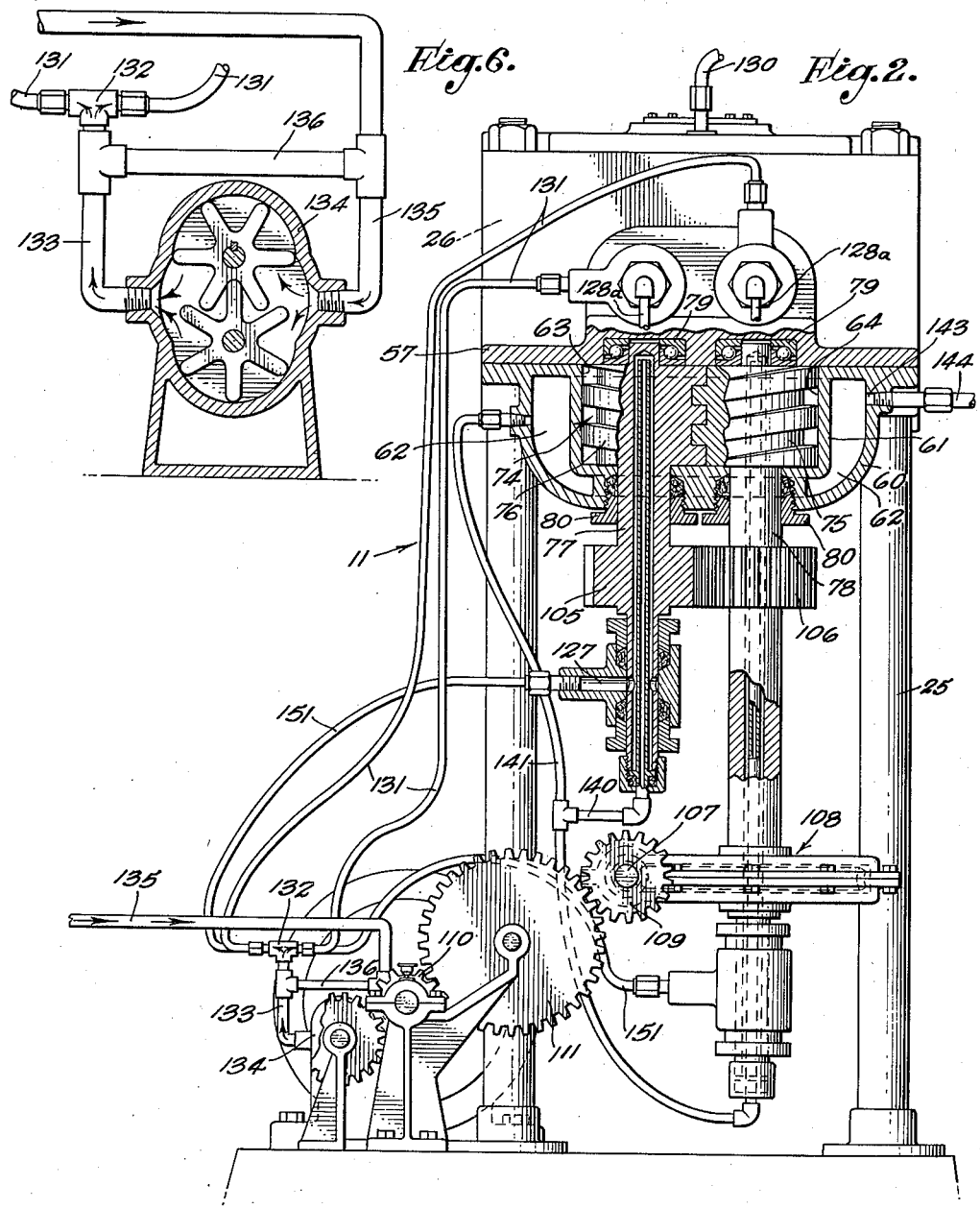
INVENTOR:
Frank A. Garbutt,
BY
Ford H. Harris
ATTORNEY.

April 5, 1932.  F. A. GARBUTT  1,852,005
METHOD OF FORMING CHEWING GUM
Filed March 4, 1931  4 Sheets-Sheet 3
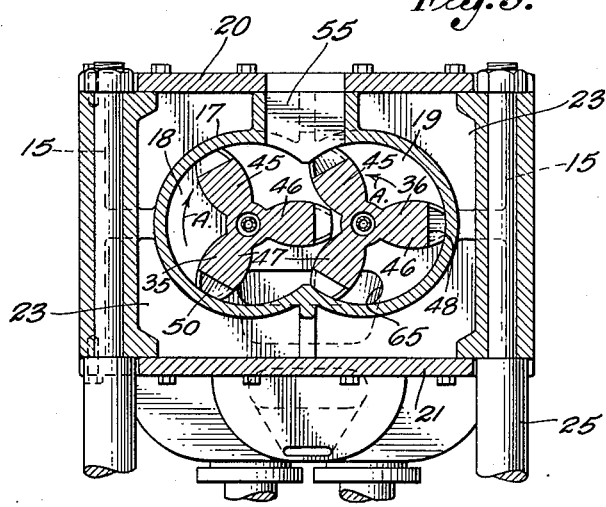
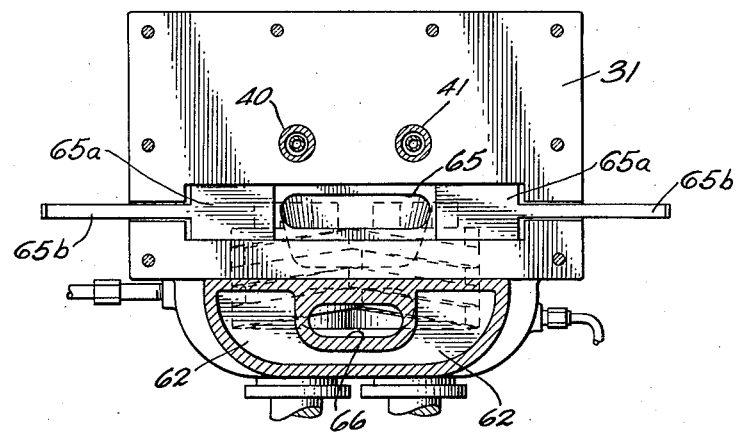
INVENTOR:
Frank A. Garbutt,
BY
Ford W. Harris
ATTORNEY.

April 5, 1932.   F. A. GARBUTT   1,852,005
METHOD OF FORMING CHEWING GUM
Filed March 4, 1931   4 Sheets-Sheet 4
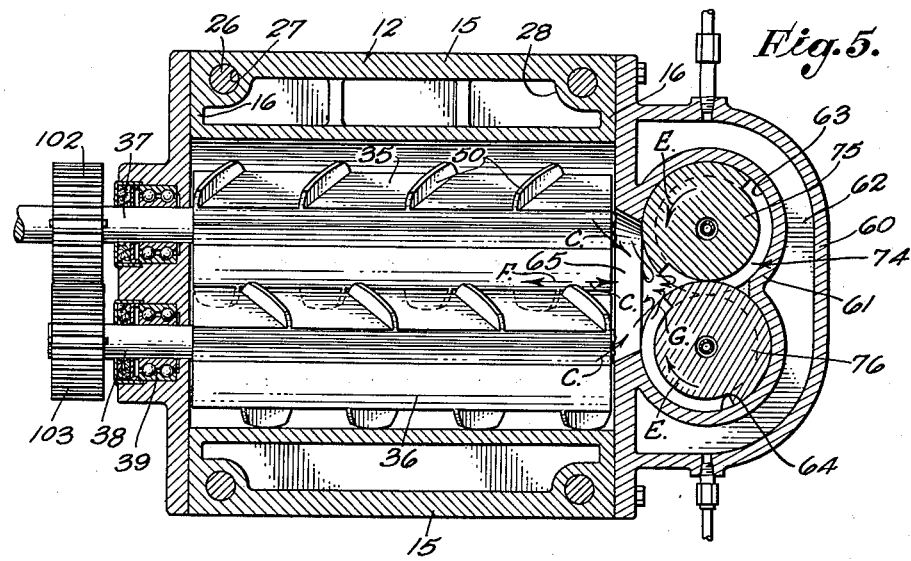
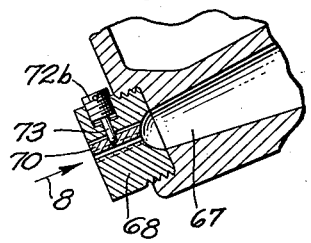
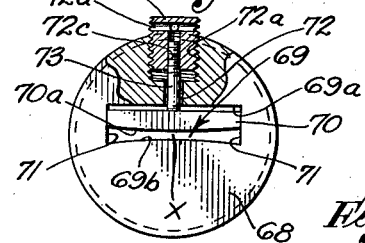
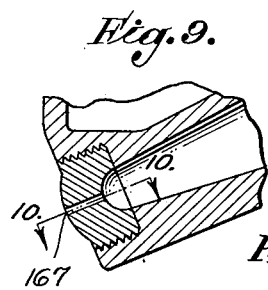
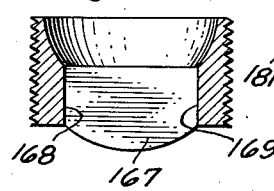
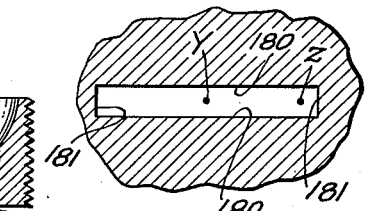
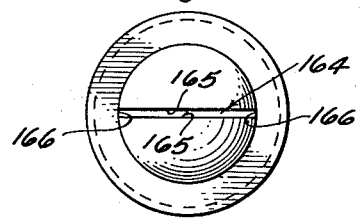
INVENTOR:
Frank A. Garbutt,
BY
Ford H. Harris
ATTORNEY.

Patented Apr. 5, 1932

1,852,005

UNITED STATES PATENT OFFICE

FRANK A. GARBUTT, OF LOS ANGELES, CALIFORNIA

METHOD OF FORMING CHEWING GUM

Application filed March 4, 1931. Serial No. 520,101.

My invention relates in general to the art of manufacturing chewing gum, and relates in particular to a method of and apparatus for kneading and mixing a gum material, and extruding the material as a finished strip suitable for subsequent cutting into desired lengths to form the desired "sticks" of gum.

In the manufacture of chewing gum the gum material is usually cooked in kettles at the melting temperature of the base or raw gum used in the compound. The gum is then delivered to an apparatus for mixing and kneading, and then is delivered in a plastic state to an apparatus for forming the gum material into sheets or strips in preparation for cutting into individual sticks. As the gum material is removed from the cooking kettles it cools rapidly, and it has been found difficult to secure the proper mechanical working at a suitable temperature necessary to produce the smooth consistency and other desirable chewing characteristics of the gum.

As the gum material is removed from the cooking kettles, according to present practice, it is usually too soft to secure the proper subsequent mechanical working. However, the gum chills so rapidly that in most of the prior art devices known to me, the mechanical mixing and kneading must be carried out immediately, so that the gum will not entirely lose its plastic state before it is finally formed into sheets or strips, which operation is usually accomplished by rolling devices.

It is important to complete the mixing and kneading operation before the gum material has cooled to such an extent that the ingredients thereof cannot be mixed into the necessary finely interlacing structure. If the gum is allowed to become chilled so that thorough mixing and kneading is not accomplished, air pockets are allowed to remain in the mass which produce unpleasant decomposition products when the gum is kept for long periods. Such pockets also affect the appearance and salability of the gum.

With the above discussed disadvantages in view, my invention has for one of its objects the provision of a machine for manufacturing chewing gum which includes means for maintaining the gum at a suitable predetermined temperature during the successive operations of mixing and kneading, and forming into strips for subsequent cutting into sticks.

It is another object of my invention to provide an apparatus of the character described including a mixing chamber which communicates with an outlet orifice through which the gum is extruded in a strip of substantially uniform width and thickness that is suitable for subsequent cutting into marketable lengths or sticks.

It is another object of my invention to provide a chewing gum machine including a mixing chamber into which the ingredients of a chewing gum may be introduced, and mixing apparatus in the chamber adapted to mix and knead the gum into final chewable texture before expelling the gum from the chamber.

Another object of my invention resides in the provision of an apparatus of the character described including unique pumping means for extruding the gum through an orifice in a continuous strip.

It is another object of my invention to provide an apparatus of the type described including mixing means, pumping means adapted to extrude the gum through an orifice, and individual heating means associated with the mixing means and the pumping means for maintaining the gum at a suitable uniform temperature during the mixing and extrusion thereof.

Another object of my invention resides in the provision of a novel form of extruding orifice shaped to equalize the frictional retarding force between the gum and surface of the orifice, so that the gum extruded from the orifice will emerge in a continuous strip having substantially uniform width, thickness, and texture.

These and other objects will be apparent from a perusal of the following part of the specification, the accompanying drawings, and the appended claims.

Referring to the drawings:

Fig. 2 is an end elevational view with certain operating parts shown in section.

Figure 1:
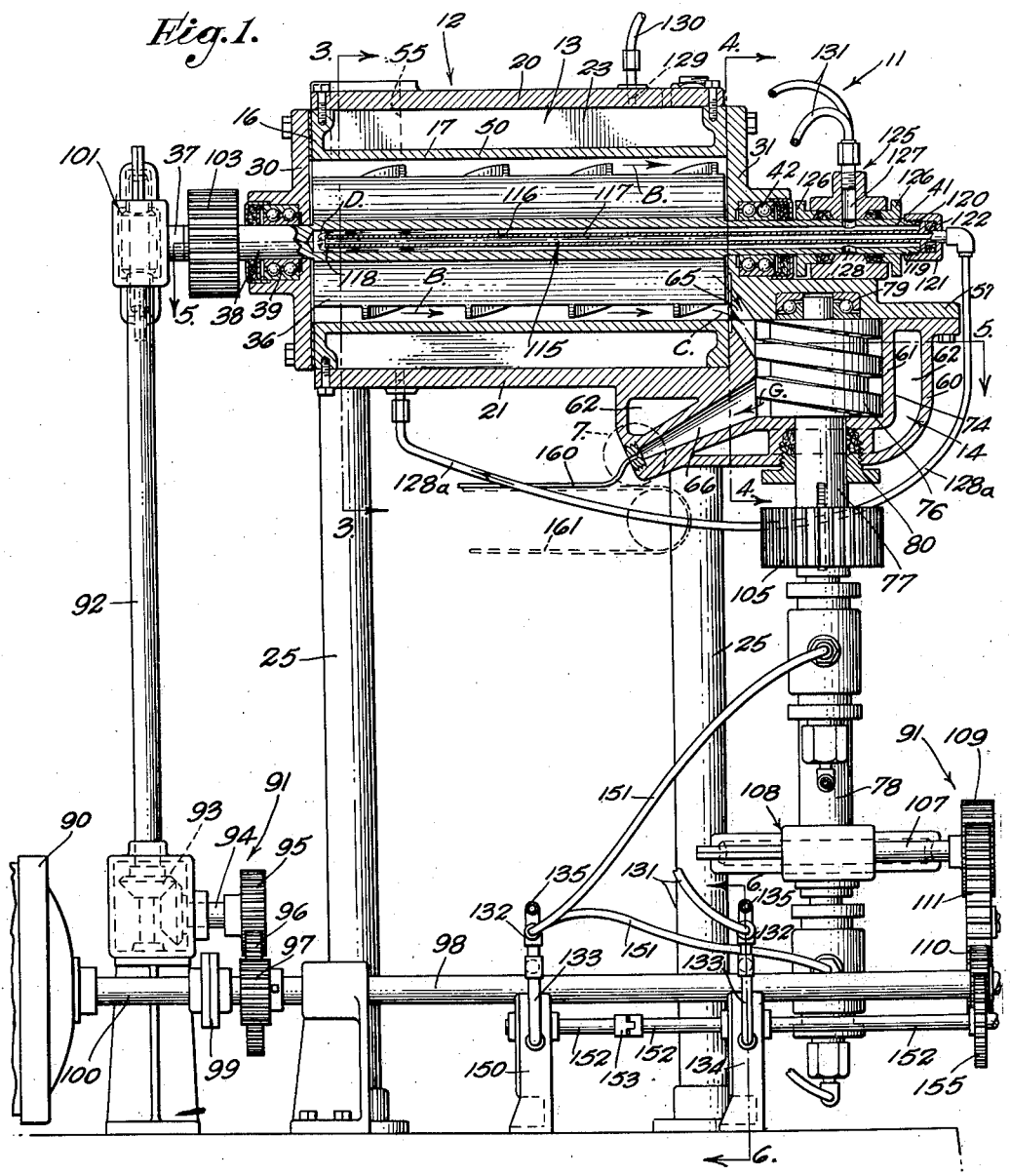
Fig. 1 is a side elevational view of the machine with the mixing chamber and the pumping chamber thereof in section to show the mixing and pumping apparatus of the invention.

Figs. 3 and 4 are vertical cross-sections taken as indicated by the corresponding lines 3—3 and 4—4 of Fig. 1.

Fig. 5 is a horizontal section taken as indicated by the staggered line 5—5 of Fig. 1.

Fig. 6 is a sectional view through a fluid pump included in the heating means of the invention, taken as indicated by the line 6—6 of Fig. 1.

Fig. 7 is a fragmentary view comparable to the portion of Fig. 1 included in the dotted line circle 7, this view being enlarged to illustrate the details of the extruding orifice of the invention.

Fig. 8 is an elevational view of the extruding orifice taken as indicated by the arrow 8 of Fig. 7.

Fig. 9 is a view comparable to Fig. 7 but showing an alternative form of extruding orifice.

Fig. 10 is a sectional view taken as indicated by the line 10—10 of Fig. 9.

Fig. 11 is an elevational view of the alternative form of extruding orifice shown in Figs. 9 and 10.

Fig. 12 is a diagrammatic fragmentary view of a rectangular orifice shown for the purpose of comparison with the extruding orifice including in my invention.

Referring first to Figs. 1 to 5 inclusive, I show my chewing gum making machine generally designated by the numeral 11, which includes a body 12 comprising a double walled mixing chamber 13 and a double walled pumping chamber 14. The mixing chamber comprises a casing, of double walled construction, providing outer side walls 15, end walls 16, and inner walls 17. These inner walls extend longitudinally of the body 12 between the end walls 16, and form complemental circular channels 18 and 19 opening through the end walls 16 and being in open communication with each other. Upper and lower cover plates 20 and 21, respectively, are provided as shown to complete a fluid circulating space 23, substantially encircling the channels 18 and 19. The body 12 is supported on legs 25 which have upper reduced diameter portions 26 extending through vertical holes 27 provided in enlarged portions 28, formed in the walls 15, the legs 25 being secured in the manner shown. The forward ends of the channels 18 and 19 are closed by an end cover plate 30 secured to the forward end wall 16, and the rearward ends of these channels are closed by an end cover plate 31 included in the pump chamber assembly 14, which plate is secured to the rearward end wall 16 of the chamber 13 by bolts, in the manner shown.

Positioned within the channels 18 and 19 are a pair of cooperating mixing and kneading elements 35 and 36, respectively, provided with integral shafts 37 and 38 which extend forwardly through suitable bearings 39 supported in the forward cover plate 30. The elements 35 and 36 are also respectively provided with integral shafts 40 and 41, which extend rearwardly through and are journalled by suitable bearings 42 supported in the rearward cover plate 31, in the manner shown.

The mixing elements 35 and 36 are somewhat propeller-like in cross-section, as shown in Fig. 3, each having a plurality of radial vanes 45, 46 and 47 which extend longitudinally and terminate just short of the forward and rearward end walls 16. The vanes of each element alternately project into the depression between two of the vanes of the adjacent element for a part of a revolution, in a loosely meshing fashion, but do not actually contact, as will be seen by inspecting Fig. 3.

Formed on the outer faces 48 of each of the elements 35 and 36 are a series of propelling blades 50. The blades 50 are disposed diagonally relative to the longitudinal axis of the elements 35 and 36, the outer surfaces thereof being of such a configuration as to be contiguous to the inner surfaces of the channels 18 and 19. The blades 50 of the mixing element 35 are reversely arranged and staggered relative to the blades 50 of the element 36 in such a manner as to cooperate in propelling a plastic material, such as gum, in a rearward direction, the gum being introduced into the forward end of the chamber 13 through an inlet opening 55.

Although I have shown and specifically described the mixing and kneading elements as having three radial vanes, it should be apparent that the number and arrangement of these vanes is more or less immaterial and that the breadth of my invention should not be limited to such details of construction.

Formed integrally with the end cover plate 31 is a horizontally extending plate 57, the lower surface of which lies in a plane substantially on a level with the bottoms of the channels 18 and 19. Secured to the plate 57, as by bolts, in the manner shown, is the pumping chamber 14 which comprises a casing of double walled construction, providing outer walls 60 and inner walls 61, these walls cooperating to form a fluid circulating passage 62. The inner walls 61 are formed to provide vertically extending complemental wells 63 and 64, the axis of which is disposed so as to intersect at right angles the axis of the horizontal mixing elements 35 and 36. The wells 63 and 64 are in open communication with each other through their entire lengths and are in open communication with the channels 18 and 19, through the medium of a transversely elongated, downwardly sloping feed passage 65, formed partly in the end plate 31 and partly in the forward wall of the pumping chamber 14, as shown best in Fig. 1. As illustrated in Figs. 3 and 5, the passage 65 forms a common outlet for the channels 18 and 19 and a common inlet for the pump wells 63 and 64. Slidably positioned in a laterally extending recess formed in the inner face of the end cover plate 31 adjacent the opening 65, are a pair of gate members 65a. These members are adapted to cooperate to close the feed passage 65 when both gate members are in their innermost positions and to allow the passage of gum through the feed passage 65 when in their outermost or retracted positions, as shown in Fig. 4. Each of the gate members 65a is provided with a handle 65b which projects outwardly from the body 12 and serves as a manual grasping means for operating the gate members.

Formed in the body of the pump chamber 14 directly below the feed passage 65 is a transversely elongated, downwardly sloping outlet passage 66 forming a common outlet for the pump wells 63 and 64. The outlet passage 66 is gradually constricted toward its outer end 67 and is closed by a plug 68 threadedly engaging the body of the chamber 14. Provided in the plug 68 is a transversely elongated extrusion orifice 69 of a unique character adapted to form a gum extruded therefrom into a thin ribbon or strip having substantially uniform width and thickness. The extrusion orifice 69 includes a transversely elongated slot 69a having an inwardly curved side wall 69b. Slidably positioned in the slot 69a is a block 70 having an inner arcuate face 70a which cooperates with the curved side wall 69b and the parallel end walls 71 of the slot 69a, to form an extrusion orifice having inwardly curved side walls providing a narrower passage at the central point "x" thereof than at points adjacent the end walls 71 thereof. Supporting the block 70 in the slot 69a is a differential screw arrangement which comprises a bore 72 formed in the body of the plug 68 at right angles to the longitudinal axis of the slot 69a, the bore 72 communicating with the slot 69a and being provided at its upper end with internal right-hand threads 72a. Threadedly engaging the threads 72a is a nut 72b, which nut is provided with a threaded axial bore 72c. The threads 72c are right-hand threads and are adapted to receive an externally threaded pin 73, which is secured to the slidable block 70 and extends outwardly therefrom through the bore 72. The nut 72b is provided with a series of drilled holes 72d, or indentations of any form provided for engagement with a tool, by which the nut 72a may be rotated relative to the plug 68. It will be clear that a rotation of the nut 72b in a clockwise direction, when viewed in plan, will cause the nut to travel inwardly in the bore 72b, and will cause the non-rotatable pin 73 to travel outwardly in the threaded bore 72c, thus moving the block 70 away from the side wall 69b and increasing the width of the orifice 69. A rotation of the nut 72b in an opposite or counter-clockwise direction will cause the nut 72b to move outwardly and will cause the pin 73, carrying the block 70, to move inwardly, thus decreasing the width of the orifice 69. This feature is particularly advantageous, inasmuch as the orifice 69 may be quickly adjusted to a desired width to compensate for changing viscosity of the gum extruded therethrough, and thus produce a strip of desired thickness without the necessity of stopping the machine, and without interrupting the continuous process of loading, mixing and extruding the gum.

Positioned in the pump chamber 14 is an extruding pump 74 comprising a pair of intermeshing screw members 75 and 76 rotatable contiguously to the inner surfaces of the pump wells 63 and 64. The screw members 75 and 76 are respectively provided with integral shafts 77 and 78, the upper ends of which are journalled in bearings 79 recessed in the plate 57, and the lower ends of which project downwardly through gland members 80, threadedly engaging the bottom walls of the pump chamber 14.

Both the mixing elements 35 and 36, and the screw members 75 and 76 are driven from a source of power, such as a motor 90 through a drive system comprising a combination of shafts and gearing, generally designated by the numeral 91. That part of the drive system comprising the drive means for the mixing elements includes a vertical drive shaft 92 supported in any suitable way, and the lower end thereof being drivably connected through a pair of bevel gears 93 to a horizontal stub shaft 94. This shaft has a gear 95 secured thereto, which is rotated by an idler gear 96 which in turn is rotated by a gear 97 secured to an elongated horizontal drive shaft 98 which is supported as shown and is connected by a suitable coupling 99 to the shaft 100 of the motor 90. The vertical drive shaft 92 is drivably connected to the horizontal shaft 37 of the element 35 by a worm and worm wheel assembly 101, and the shaft 38 is driven by the shaft 37 through intermeshing gears 102 and 103 secured to the shafts 37 and 38, respectively.

That part of the drive system comprising the drive means for the extruding pump 74 includes a pair of gears 105 and 106 formed integrally with or otherwise secured to the vertical screw shafts 77 and 78 respectively, at a plane directly below the pump chamber 14. The shaft 78 is continued downwardly a considerable distance below the gears 105 and 106, and is drivably connected to a horizontal stub shaft 107 supported on suitable brackets, not shown, through a worm and worm wheel assembly 108. Mounted on the stub shaft 107 is a gear 109 which is driven by an idler gear 111 which in turn is driven by a gear 110 secured to the drive shaft 98.

The parts of the invention just described comprise a complete apparatus for mixing and kneading, and pumping and extruding a plastic material, which apparatus includes novel features and is particularly adapted for use in connection with materials requiring no particular care as to the maintenance of the temperature thereof.

It is, of course, apparent that the invention should not be limited to the details of construction illustrated in the drawings, such as the configuration and area of the fluid circulating spaces 23 and 62, the feed passage 65, and the outlet passage 66. The exact arrangement of the drive system 91 is also obviously immaterial.

As has been previously explained, it is desirable, when handling a plastic material such as chewing gum, to maintain the material at a suitable temperature. The preferred form of my invention, therefore, includes an individual heating means associated with each of the mixing elements 35 and 36 and also with each of the pump screws 75 and 76, the details of which I will now describe. Since the parts of the individual heating means and the arrangement thereof with the respective mixing elements and pump screws are identical, I will describe only one, such as the heating means 115 cooperating with the mixing element 36, and I will characterize the identical parts of each with the same numerals.

Referring in particular to Fig. 1, the mixing element 36 is provided with an axial bore 116 extending from the end of the rearwardly projecting shaft 41 to a point adjacent the forward end of the element 36. Positioned axially within the bore 116 is a tubular member 117 which is of smaller exterior diameter than the diameter of the bore 116 and which terminates at 118, just short of the forward end of the bore 116. Adjacent its rearward end the tubular member 117 is provided with a flange 119 adapted to abut against the rearward end 120 of the shaft 41. The flange 119 is confined in this position by a gland member 121 including packing means 122, the gland being threadedly connected to exterior threads provided on the rearward end 120 of the shaft 41, as shown, in such a manner as to permit the shaft 41 and the mixing element 36 to rotate while the tubular member 117 remains stationary.

Positioned on the rotatable shaft 41 between the gland member 121 and the bearing 42 is a stationary double gland 125 including a packing member 126 in each end thereof and being provided with an intermediate fluid inlet opening 127 adapted to register alternately with a series of lateral ports 128 formed in the shaft 41 and communicating with the bore 116.

Threadedly connected to the rearward ends of those tubular members 117 associated with the mixing elements 35 and 36 are a pair of pipes 128ª which lead to the forward end of the mixing chamber 13, as shown, and which place the tubes 117 in communication with the fluid circulating space 23 surrounding the channels 18 and 19. Provided at a remote point in the chamber 13 is an outlet opening 129 from which a return pipe 130 leads to a source of supply, not shown. As shown best in Figs. 1 and 2, a pair of pipes 131 are connected by threaded nipples and couplings in the inlet openings 127 of each of those double glands 125 that is associated with the mixing elements. The pipes 131 are likewise connected by a T-fitting 132 to the outlet pipe 133 of a fluid pump 134, which is shown in detail in Fig. 6 as having an inlet pipe 135 connected to a source of supply not shown, and as being provided with a by-pass pipe 136 connecting the inlet pipe 135 and the outlet pipe 133 in an ordinary manner.

Connecting the outer ends of those tubular members 117 that are associated with the pump shafts 77 and 78 with the fluid circulating space 62 of the pump chamber 14 are pipes 140 and 141 which are coupled together to form a common delivery line, as shown in Fig. 2. Provided at a remote point in the chamber 14, and communicating with the space 62, is an outlet opening 143 from which a return pipe 144 leads to a second source of supply.

Connecting the inlet openings 127 of those glands 125 that are associated with the pump shafts 77 and 78 with the outlet pipe 133 of a pump 150, are a pair of pipes 151. The pump 150 is identical with the pump 134, the driven shafts 152 of these pumps being coaxially arranged and connected together by a suitable coupling 153. Secured to the driven shaft 152 of the pump 134 is a gear 155 which meshes with and is driven by the gear 110 on the drive shaft 98.

The operation of my invention is as follows:

The constituents of a chewing gum, including the base, flavoring, sugar, etc., are introduced into the mixing chamber 13 through the inlet opening 55, either separately or as a mass, by any suitable means. The mixing elements 35 and 36 are suitably driven by the drive system 91 so as to rotate in clockwise and counter-clockwise directions, respectively, when viewed as in Fig. 3, as indicated by the arrows "A". The gum is thoroughly mixed and kneaded by the intermeshing action of the vanes 45, 46, and 47 while at the same time it is propelled rearwardly in the direction of the arrows "B" of Fig. 1 by the blades 50. At this time the gate members 65a are preferably closed and are kept closed until the mixing chamber 13 is completely filled with gum under a considerable pressure. At this time the gate members 65a are moved to their retracted positions, as shown in Fig. 4, and the gum adjacent the feed passage 65, which gum is in a thoroughly mixed condition and of a final chewable texture, is forced through the passage 65 into the pump chamber 14, as indicated by the arrows "C" of Figs. 1 and 5. After the gate members 65a have been opened subsequent to the initial loading of the chamber 13, my machine is adapted to operate continuously, the gum being continuously introduced into the chamber 13 as above described, where it is thoroughly mixed and at the same time constantly propelled toward the feed passage 65. As the gum is being mixed and kneaded in the mixing chamber, a fluid at a suitable temperature is constantly delivered by the pump 134 to the inlet openings 127 of those gland members 125 associated with the mixing elements, and is caused to flow forwardly through the bores 116 and to return rearwardly through the tubes 117, as indicated by the arrows "D" of Fig. 1. After circulating through the bores 116 and the tubes 117 the fluid is delivered to the space 23 through the pipes 128a and is caused to circulate around the channels 18 and 19 before being carried away by the return pipe 130. If desired, additional pumping means may be placed in the line 130 to assist the pump 134 in circulating the fluid. It will be seen that by this circulation of fluid within the mixing elements 35 and 36 and around the comparatively thin walled channels confining the gum during the mixing thereof, it is possible to maintain the temperature of the gum at any desired temperature by varying the temperature of the fluid to suit conditions.

The pump screws 75 and 76 are suitably driven by the drive system 91 so as to rotate counter-clockwise and clockwise, respectively, when viewed as in Fig. 5, as indicated by the arrows "E" of this figure. It is important to note that as the mass of gum is delivered into the pump chamber as indicated by the arrows "C" it is moving substantially in the same direction as the pump screws 75 and 76. In other words, that portion of the mass of gum entering the passage 65 on the side of the screw 75 moves convergently inward toward the longitudinal axis of the body 12, substantially in the direction of rotation of the screw 75, and likewise that portion of the gum entering the other side of the passage 65 moves convergently inward substantially in the direction of rotation of the screw 76. As a result, no appreciable back pressure is exerted on the mass of gum which would tend to pile it up and force it backward out of the passage 65 in the direction of the arrow "F" of Fig. 5. Owing to the contiguous relation between the teeth of the screw members 75 and 76, none of the gum can pass between these screw members at their point of contact, but is squeezed backward and downward into the outlet passage 66, as indicated by the arrows "G" of Figs. 1 and 5, this action being assisted by the pitch of the teeth of the screw members.

Inasmuch as heating fluid is circulated by the pump 150 throughout the length of the pump shafts, and through the space 62 surrounding the pump wells and the outlet passage of the pump chamber in substantially the same manner as has been previously described in connection with the mixing elements and mixing chamber, I will dispense with the description of the operation of the pump heating apparatus.

The gum, delivered into the outlet passage under considerable pressure by the pump, is extruded from the orifice in a comparatively thin, continuous strip 160 which may be received upon an endless conveyor, indicated by dotted lines 161, adapted to carry the strip to any suitable apparatus for cutting the strip into suitable lengths or sticks.

In order to impart a clearer understanding of the purpose of forming my preferred extruding orifice in the manner shown in Figs. 7 and 8, I will, as briefly as possible, describe the action occurring when a mass material having the viscosity of chewing gum is extruded through an orifice which is rectangular in cross-section, such an orifice being shown in Fig. 12. Considering the flow of gum as constituting a large number of molecules, it will at once be apparent that the molecules in the center of the extruding mass (hereinafter called the central molecules as distinguished from the outer layer of molecules in contact with the walls of the orifice) have exerted thereon retarding forces due to the internal frictional force, or in other words, the friction between adjacent molecules. The outer molecules, however, have exerted thereon, as they are forced through the orifice, an additional and larger frictional force due to being moved along and in contact with the orifice. This additional frictional retarding force set up on the outer layer of molecules tends to slow up the movement of those central molecules immediately adjacent thereto (due to the internal frictional force between molecules), and eventually every molecule in the flowing mass feels the effect of this additional frictional force to which the outer molecules are subjected, though this effect is, of course, unequal, those molecules in the very center of the extruding mass having the least retarding force exerted thereon. In fact, each central molecule is subjected to a retarding effect produced (1) by the side walls 180, and (2) by the end walls 181 of the orifice, and this retarding effect depends upon the proximity of this molecule to these side and end walls. Looking at the matter in another light, the retarding effect of the side walls 180 (hereinafter called a primary retarding effect) is distributed between the molecules extending therebetween, while the retarding effect of the end walls 181 (hereinafter called the secondary retarding effect) is distributed between all of the molecules therebetween. A molecule "Y" at the very center of the extruding mass is thus subjected to a small secondary retarding force (due to the large distance between the end walls 181) but is subjected to a large primary retarding effect (due to the spacing of the side walls 180). A molecule "Z" equidistant from the side walls 180 but closer to one of the end walls 181 is subjected to the same primary retarding effect as the molecule "Y", but to a much larger secondary retarding effect due to its proximity to the end walls 181. The net result is that the mass flows easier, and thus faster, through the central portion of the orifice than through the end portion thereof, resulting in a stream of gum thicker at the center than at the sides.

I have found that by curving the side walls 70 of my preferred form of extruding orifice 69 inwardly, I equalize this retarding effect throughout the cross-sectional area of the orifice. In other words, I gradually constrict the orifice and thus increase the retarding effect and decrease the velocity of the mass gradually from the end walls 72 and 73 towards the center of the orifice, sufficiently to compensate for the retarding effect and consequent velocity of the mass at the ends thereof, and find that the desired continuous strip of gum of equal thickness is formed.

In Figs. 9 to 11, inclusive, I have shown an alternative form of extruding orifice 164 in which the side walls 165 are parallel, as are the end walls 166. The side walls 165 are arcuated at the delivery end 167 of the orifice, as shown in Fig. 10, which increasingly lengthens the orifice from the ends 168 and 169 toward the center thereof. It will be seen that the increased length of the central portions of the side walls 165 will tend to increase the retarding effect on the mass and decrease the velocity of the mass gradually from the end walls 166 toward the center of the orifice, to compensate for the retarding effect and consequent velocity of the mass at the ends thereof. In this form, due to the fact that the orifice is of the exact cross-sectional configuration desired for the strip of gum extruded therefrom, the retarding effects are balanced so that the velocity of flow is equal at all points in a cross-section of the gum as it is extruded from the orifice.

Chewing gum is commonly sold in the form of "sticks" which are wrapped in paper and foil and sold as single sticks or assembled usually in "packs" of five sticks. The conventional stick of gum is usually ¾" wide, $\frac{1}{16}$" thick, and 2¾" long. Some conventional sticks of gum are slightly wider, thicker, and shorter. The terms "conventional size" or "stick size" are used herein to designate gum ¾" wide and $\frac{1}{16}$" thick, or slightly wider and thicker.

It is necessary that the gum at the time of extrusion be in a condition of "stable plasticity", by which I mean sufficiently plastic to extrude readily and at the same time hard enough to keep its shape.

Although I have herein shown and described only one complete embodiment of my invention, it is apparent that numerous features thereof might be changed and that various embodiments thereof might be devised, all coming within the scope of my invention.

I claim as my invention:

1. A method of forming chewing gum into a strip having substantially uniform width and thickness and being suitable for subsequent cutting into conventional sized sticks, which includes the steps of: mixing and kneading the constituents of said gum into final chewable texture; and extruding said gum through an orifice as such a strip.

2. A method of forming chewing gum into a strip having substantially uniform width and thickness and being suitable for subsequent cutting into conventional sized sticks, which includes the steps of: mixing and kneading the constituents of said gum as a suitable temperature into final chewable texture; and extruding said gum through an orifice while maintaining the temperature of said gum at a suitable predetermined point.

3. A method of forming chewing gum into a strip having substantially uniform width and thickness and being suitable for subsequent cutting into conventional sized sticks, which includes the steps of: mixing and kneading the constituents of said gum into final chewable texture; and extruding said gum through an orifice to form such a continuous strip.

4. A method of forming chewing gum into a strip having substantially uniform width and thickness and being suitable for subsequent cutting into conventional sized sticks, which includes the steps of: mixing and kneading the constituents of said gum at a suitable temperature into final chewable texture; and extruding said gum through an orifice to form a continuous stick sized strip while maintaining the temperature of said gum at a suitable predetermined point.

In testimony whereof, I have hereunto set my hand at Los Angeles, California, this 26 day of February, 1931.

FRANK A. GARBUTT.